United States Patent [19]

Herbst et al.

[11] Patent Number: 4,988,653
[45] Date of Patent: Jan. 29, 1991

[54] ELUTRIABLE MULTI COMPONENT CRACKING CATALYST MIXTURE AND A PROCESS FOR CATALYTIC CRACKING OF HEAVY HYDROCARBON FEED TO LIGHTER PRODUCTS

[75] Inventors: Joseph A. Herbst, Turnersville; Hartley Owen, Belle Mead, both of N.J.; Paul H. Schipper, Wilmington, Del.

[73] Assignee: Mobil Oil Corporation, Fairfax, Va.

[21] Appl. No.: 292,272

[22] Filed: Dec. 30, 1988

[51] Int. Cl.$^5$ .............................................. B01J 29/06
[52] U.S. Cl. ....................................... 502/67; 502/61; 502/68
[58] Field of Search .............................. 502/67, 61, 68

[56] References Cited

U.S. PATENT DOCUMENTS

| | | | |
|---|---|---|---|
| 3,758,403 | 9/1973 | Rosinski et al. | 502/67 |
| 3,894,940 | 7/1975 | Scherzer et al. | 502/67 |
| 3,928,172 | 12/1975 | Davis, Jr. et al. | 208/77 |
| 4,447,552 | 5/1984 | Hayes et al. | 502/41 |
| 4,477,336 | 10/1984 | Scherzer | 502/67 |
| 4,612,298 | 9/1986 | Hettinger et al. | 502/65 |
| 4,686,312 | 8/1987 | Yung-Feng Chu et al. | 585/315 |
| 4,794,095 | 12/1988 | Walker et al. | 502/64 |
| 4,818,738 | 4/1989 | Chu et al. | 502/67 |
| 4,834,867 | 5/1989 | Gilson | 502/61 |

Primary Examiner—Carl F. Dees
Attorney, Agent, or Firm—Alexander J. McKillop; Charles J. Speciale; Richard D. Stone

[57] ABSTRACT

A catalytic cracking catalyst mixture and process are disclosed. The mixture comprises (a) a cracking catalyst containing a matrix and a large pore molecular sieve and (b) separate particles of additive catalyst comprising at least one of a shape selective paraffin cracking-/isomerization zeolite and a shape selective aliphatic aromatization zeolite. An exemplary catalyst mixture comprises dealuminized zeolite Y, optionally containing rare earth elements, in an alumina rich matrix and an additive catalyst of HZSM-5, and gallium ZSM-5 in a matrix. The alumina matrix of the cracking catalyst acts as a sodium and metals sink. The large pore molecular sieve catalyst cracks large hydrocarbons to lighter paraffins and olefins. The shape selective paraffin cracking-/isomerization component cracks the paraffins produced by the large pore molecular sieve. The shape selective aliphatic aromatization catalyst converts light paraffins and olefins into aromatics. A single shape selective zeolite, e.g., ZSM-5 with a controlled amount of an aromatization component such as gallium, may promote both paraffin cracking/isomerization and aromatization. The additive catalyst is separable by physical means from the cracking catalyst, preferably by elutriation.

18 Claims, 1 Drawing Sheet

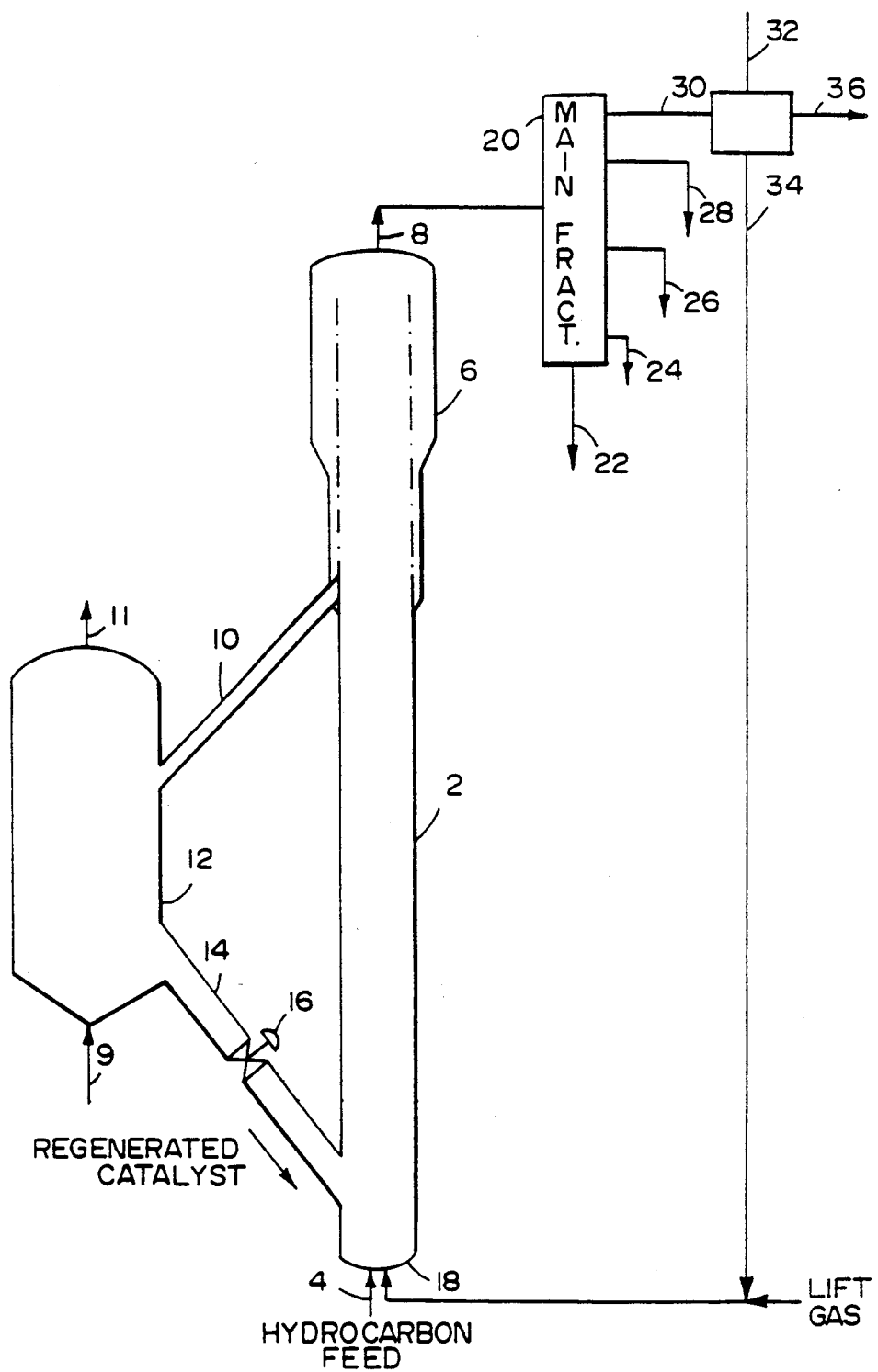

ELUTRIABLE MULTI COMPONENT CRACKING CATALYST MIXTURE AND A PROCESS FOR CATALYTIC CRACKING OF HEAVY HYDROCARBON FEED TO LIGHTER PRODUCTS

FIELD OF THE INVENTION

This invention relates to catalytic cracking of heavy hydrocarbon oils to produce liquid hydrocarbons boiling in the gasoline and distillate range.

BACKGROUND OF THE INVENTION

The present invention can best be understood in the context of its contribution to conventional FCC processes. Accordingly, a brief discussion of conventional cracking processes and catalysts follows.

Conversion of heavy petroleum fractions to lighter products by catalytic cracking is well known in the refining industry. Fluidized Catalytic Cracking (FCC) is particularly advantageous for that purpose. The heavy feed contacts hot regenerated catalyst and is cracked to lighter products. Carbonaceous deposits form on the catalyst, thereby deactivating it. The deactivated (spent) catalyst is separated from cracked products, stripped of strippable hydrocarbons and conducted to a regenerator, where coke is burned off the catalyst with air, thereby regenerating the catalyst. The regenerated catalyst is then recycled to the reactor. The reactor-regenerator assembly are usually maintained in heat balance. Heat generated by burning the coke in the regenerator provides sufficient thermal energy for catalytic cracking in the reactor. Control of reactor conversion is usually achieved by controlling the flow of hot regenerated catalyst to the reactor to maintain the desired reactor temperature.

In most modern FCC units, the hot regenerated catalyst is added to the feed at the base of a riser reactor. The fluidization of the solid catalyst particles may be promoted with a lift gas. Mixing and atomization of the feedstock may be promoted with steam, equal to 1-5 wt % of the hydrocarbon feed. Hot catalyst (650° C.+) from the regenerator is mixed with preheated (150°-375° C.) charge stock. The catalyst vaporizes and superheats the feed to the desired cracking temperature usually 450°-600° C. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products pass to product separation. Typically, the cracked hydrocarbon products are fractionated into a series of products, including gas, gasoline, light gas oil, and heavy cycle gas oil. Some heavy cycle gas oil may be recycled to the reactor. The bottoms product, a "slurry oil", is conventionally allowed to settle. The catalyst rich solids portion of the settled product may be recycled to the reactor. The clarified slurry oil is a heavy product.

The "reactor vessel" into which the riser discharges primarily separates catalyst from cracked products and unreacted hydrocarbons, and permits catalyst stripping.

Older FCC units use some or all dense bed cracking. Down flow operation is also possible, in which case catalyst and oil are added to the top of a vertical tube, or "downer," with cracked products removed from the bottom of the downer. Moving bed analogs of the FCC process, such as Thermofor Catalytic Cracking (TCC) are also known.

Further details of FCC processes can be found in: U.S. Pat. Nos. 3,152,065 (Sharp et al); 3,261,776 (Banman et al); 3,654,140 (Griffel et al); 3,812,029 (Snyder); 4,093,537, 4,118,337, 4,118,338, 4,218,306 (Gross et al); 4,444,722 (Owen); 4,459,203 (Beech et al); 4,639,308 (Lee); 4,675,099, 4,681,743 (Skraba) as well as in Venuto et al, Fluid Catalytic Cracking With Zeolite Catalysts, Marcel Dekker, Inc. (1979). The entire contents of these patents and publication are incorporated herein by reference.

Conventional FCC catalysts usually contain finely divided acidic zeolites comprising, e.g., faujasites such as Rare Earth Y (REY), Dealuminized Y (DAY), Ultrastable Y (USY), Rare Earth Containing Ultrastable Y (RE-USY), and Ultrahydrophobic Y (UHP-Y).

Typically, FCC catalysts are fine particles having particle diameters ranging from about 20 to 150 microns and an average diameter around 60-80 microns.

Catalyst for use in moving bed catalytic cracking units (e.g. TCC units) can be in the form of spheres, pills, beads, or extrudates, and can have a diameter ranging from 1 to 6 mm.

Although many advances have been made in both the catalytic cracking process, and in catalyst for use in the process, some problem areas remain.

The catalytic cracking process is excellent for converting heavy hydrocarbons to lighter hydrocarbons. Although this conversion is the whole reason for performing catalytic cracking, the boiling range of the cracked product is frequently not optimum for maximum profitability. Usually the gasoline and fuel oil boiling range fractions are the most valuable materials. Light olefins ($C_2-C_{10}$ olefins) are highly valuable only if a refiner has a way to convert these olefins into gasoline boiling range materials via e.g. alkylation, or if these light olefins can be used for their petrochemical value. Light paraffins, $C_{10}^-$ materials, are generally not as valuable because of their relatively low octane. The very light paraffins, particularly propane, usually are not as valuable as gasoline. There are ever more stringent limitations on the allowable vapor pressure of gasoline, such that refiners can not blend as much light material into the gasoline as they would like to. Accordingly, there is great interest in converting "top of the barrel" components, or light hydrocarbons in the $C_{10}^-$ boiling range, into heavier products.

There is also a growing need in refineries to convert more of the "bottom of the barrel" or resid fractions into lighter components via catalytic cracking. Many FCC units today add 5-15 wt % resid, or non-distillable feed, to the catalytic cracking unit. Such heavy materials in the past were never considered as suitable feeds for catalytic cracking units, because of their high levels of Conradson Carbon, sodium, and dehydrogenation metals such as nickel and vanadium. The market for resids (bunker fuel oil, road asphalt) is so limited that refiners have turned to FCC as one way to upgrade the value of the resid fraction.

The most limiting factor in catalytic cracking of resids in conventional FCC units appears to be metals deposition on the catalyst. The nickel and vanadium in the resid deposit almost stoichiometrically on the FCC circulating catalyst inventory, leading to production of excessive amounts of "dry gas" during catalytic cracking. This problem can be ameliorated to some extent by adding metal passivators, such as antimony and/or tin, to passivate the nickel and vanadium components deposited on the catalyst due to processing of resid feed. Usually refiners are also forced to resort to very high levels of catalyst withdrawal and replacement, to maintain the metals levels on the catalyst at a tolerable level, and to maintain catalyst activity. This represents a large daily expense (for make-up catalyst) and presents a disposal problem because the spent catalyst has so much heavy metal on it.

Attempts have been made to modify catalytic cracking catalyst to accomodate heavy feeds. It is known that commercially available FCC catalysts with a high surface area, and an alumina rich matrix, are more resistant to deactivation from metals contamination than other FCC catalysts (Speronello, B. K. and Reagan, W. J., *Oil and Gas Journal*, Jan. 30, 1984, page 139). See also "Method Predicts Activity of Vanadium-Contaminated FCC Catalyst", E. L. Leuenberger, *Oil and Gas Journal*, July 15, 1985, page 125.

Another approach to metals passivation is disclosed in U.S. Pat. No. 4,372,841, incorporated herein by reference. Adding a hydrogen donor material to the reaction zone and passing catalyst through a reduction zone at high temperature at least partially passivates the catalyst.

Vanadium, when deposited on a catalyst, is fairly mobile and can migrate to zeolite sites, attack the zeolite and destroy it. This phenomenon was discussed in "Metals Resistant FCC Catalyst Gets Field Test," Jars, Dalen, *Oil and Gas Journal*, Sept. 20, 1982, Page 135.

Although catalyst manufactures are working on catalysts which apparently can tolerate fairly high levels of metals, and thus permit conversion of more of the "bottom of the barrel" into light products, they have largely ignored the economically related problem of converting light materials, produced during cracking, into more valuable, heavier components.

We have discovered an elutriable, multi component cracking catalyst mixture, and a catalytic cracking process using this catalyst mixture, which is metals tolerant and significantly changes the product distribution from catalytic cracking. We have discovered a way to efficiently convert, in a catalytic cracking unit, the "bottom of the barrel" into more valuable products, and in a preferred embodiment also convert the relatively low value "top of the barrel" materials (incidentally produced during cracking) into more valuable products boiling in the gasoline range. Our elutriable catalyst mixture also allows a measure of control of the amount of "top of the barrel" conversion that occurs.

BRIEF SUMMARY OF THE INVENTION

Accordingly, the present invention provides a catalytic cracking catalyst mixture comprising catalytically effective amounts of a blend of a cracking catalyst of a large pore molecular sieve in a matrix, and an additive catalyst, separable by physical means from the cracking catalyst, comprising a shape selective zeolite having a constraint index of 1-12, being substantially free of hydrogenation/dehydrogenation components, and having paraffin cracking/isomerization activity, a shape selective zeolite having a constraint index of 1-12 and having paraffin aromatization activity and a matrix.

In another embodiment, the present invention provides a process for catalytic cracking a heavy hydrocarbon feed to lighter products by contacting the feed at catalytic cracking conditions with a cracking catalyst mixture comprising a blend of a cracking catalyst of a large pore molecular sieve in a matrix, and an additive catalyst, separable by physical means from the cracking catalyst, of a shape selective zeolite having a constraint index of 1-12, being substantially free of hydrogenation/dehydrogenation components, and having paraffin cracking/isomerization activity, a shape selective zeolite having a constraint index of 1-12 and having paraffin aromatization activity and a matrix.

BRIEF DESCRIPTION OF THE DRAWING

FIG. 1 is a schematic diagram of a conventional FCC reactor and regenerator.

DETAILED DESCRIPTION OF THE DRAWING

FIG. 1 is a schematic flow diagram of an exemplary FCC unit. Feed is charged to the bottom of the riser reactor 2 via inlet 4. Hot regenerated catalyst is added via conduit 14, equipped with a flow control valve 16. A lift gas is introduced near the liquid and solid feed inlets via conduit 18. The riser reactor is an elongated, cylindrical smooth-walled tube.

The feed vaporizes and forms a dilute phase suspension with the FCC catalyst. The suspension passes up the riser, which generally gets wider to accomodate volumetric expansion. Cracked products and coked catalyst may pass into a solid-vapor separation means, such as a conventional cyclone. Preferably, the riser has a deflector and a short residence time stripper, as disclosed in U.S. Pat. No. 4,629,552 (Hadded and Owen) incorporated by reference. Another good design is the closed cyclone design disclosed in U.S. Pat. No. 4,749,471 (Kam et al) which is incorporated by reference. A means for stripping entrained hydrocarbons from the catalyst is usually provided in the base of vessel 6. Neither this stripping section, nor the solid-gas separation equipment is shown in the drawing for clarity. Such equipment is conventional. Cracked products are withdrawn from the reactor by conduit 8.

Stripped catalyst containing coke is withdrawn via conduit 10 and charged to regenerator 12. The catalyst is regenerated by contact with an oxygen-containing gas, usually air added via line 9. Flue gas is withdrawn from the regenerator by line 11.

Usually the feed temperature is about 150° C. to 375° C. The regenerator operates at about 650° C. to 750° C. and the catalyst to feed weight ratio is usually about 3:1 to 10:1, adjusted as necessary to hold a reactor outlet of about 450° C. to 550° C.

Cracked product from the FCC unit passes from outlet 8 to main fractionator 20, where product is separated into a heavy, slurry oil stream 22, heavy distillate 24, light distillate 26, naphtha 28, and a light overhead stream 30, rich in C2-C4 olefins, C1-C4 saturates, and other light cracked gas components. This light stream is usually treated in an unsaturated gas plant 32 to recover various light gas streams, including C3-C4 LPG, and optionally $C_2^-$ fuel gas or the like.

Preferably a light, $H_2$ rich gas stream is recycled from the gas plant via line 34 for use as all, or part, of a lift gas used to contact catalyst in the base of riser 2.

DETAILED DESCRIPTION OF PREFERRED EMBODIMENTS

Each important parameter of the process will be discussed. Those parts of the process which are conventional will receive only brief mention. The following will be considered:

1. Feedstocks

2. Elutriable Catalyst Mixture
3. Bottom of the Barrel Catalyst (e.g., REY in matrix)
4. Top of the Barrel Catalyst (e.g., ZSM-5 in a matrix)
5. Catalyst Physical Properties
6. FCC cracking conditions
7. Riser elutriation
8. Stripper Elutriation
9. Catalyst regeneration (e.g., w/air)
10. Catalyst reactivation (e.g., w/olefins)
11. Catalyst Manufacture Although each parameter is discussed, not all embodiments of the invention will require all elements discussed above. All elements will cooperate to upgrade heavy feeds, but economics will determine if, e.g., there is a reasonable return on investment from having both riser elutriation and stripper elutriation.

FEEDSTOCKS

The catalyst and process of the present invention work very well in conventional FCC units processing conventional cracking feeds, such as gas oils, and vacuum gas oils. The maximum benefit from the present invention is achieved when a heavy, metals containing residual feed is at least part of the feed to the catalytic cracking unit.

Most FCC and TCC units crack gas oil or vacuum gas oil feeds, i.e., those having an initial boiling point above 400°–500° F., and an end boiling point above 750°–850° F.

The feed can include any wholly or partly non-distillable fraction, e.g. 650° C.+ boiling range material. Resids, deasphalted resids, tar sands, shale oils, coal liquids and similar heavy material, may be used as part or all of the feed.

ELUTRIABLE CATALYST MIXTURE

The elutriable catalyst mixture used herein contains at least two different molecular sieve components and a matrix component. Preferably, three different molecular sieve components and a matrix are used for a total of four components. The preferred catalyst mixtures perform four different functions. We may refer to these catalyst mixtures hereafter as "quadro" catalysts.

The quadro catalyst comprises at least one component for bulk conversion, i.e., doing most of the conversion of heavy feed and "bottom of the barrel" to light components (including "top of the barrel" components). This bulk conversion component can be a conventional FCC catalyst, e.g., USY in a silica-alumina clay matrix or a non-conventional FCC catalyst, e.g., a large pore aluminophosphate in a matrix comprising large pore pillared clays.

Other components comprise shape selective zeolites having a constraint index of 1–12 which upgrade or convert the "top of the barrel" to more valuable products.

The shape selective zeolite components are present in the mixture as particles which are separable by physical means, preferably by elutriation, from the bulk conversion component.

Accordingly, the catalyst mixture comprises:
(A) "Bottom of the Barrel" Conversion Components:
 (1) A matrix, preferably containing alumina
 (2) A large pore molecular sieve, preferably containing one component from the zeolite Y family
(B) "Top of the Barrel" Conversion Components:
 (3) A shape selective paraffin cracking/isomerization zeolite, preferably HZSM-5
 (4) A shape selective aliphatic aromatization zeolite, preferably GaZSM-5.

The large pore molecular sieve and matrix may be conventional or non-conventional materials but the bulk conversion catalyst will be conventionally sized, e.g. having a range of particle diameters from about 20 to about 120 microns and an average particle diameter within the range of 60–80 microns.

The shape selective paraffin cracking/isomerization component, e.g. HZSM-5 is preferably in a matrix, and has physical characteristics which permit its separation from the conventionally sized, bulk conversion catalyst.

The preferred, but optional, paraffin aromatization component can be associated with (1) the conventionally sized catalyst, (2) the paraffin cracking/isomerization catalyst (3) a separate particle catalyst comprising only paraffin aromatization zeolites or (4) some combination of 1–3.

The function of the matrix and large pore molecular sieves in the "Bottom of the barrel" conversion component will be discussed first, followed by a discussion of the "Top of the barrel" conversion components, the shape selective zeolites.

Bottom of the Barrel Conversion Catalyst

Bottom of the barrel conversion involves a catalyst comprising a matrix and at least one large pore cracking component.

Matrix

The matrix can be conventional. The function of the matrix in catalytic cracking catalyst is well known. Briefly stated, it protects the relatively soft and fragile molecular seive components from physical damage. The matrix acts to some extent as a sodium and metals sink, and minimizes localized high temperatures when burning coke from the molecular sieve.

Matrix materials include both synthetic and natural substances. Such substances include clays, silica and/or metal oxides. The latter may be either naturally occurring or in the form of gelatinous precipitates, sols or gels including mixtures of silica and metal oxides. Frequently, molecular sieves materials have been incorporated into naturally occurring clays, e.g., bentonite and kaolin.

In addition to the foregoing materials, the zeolite or molecular sieve for use herein can be composited with a porous matrix material such as silica-alumina, silica-magnesium, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above specified cogels to form a matrix is highly preferred.

The preferred matrix material, alumina, functions not only as a conventional matrix but also acts in the present invention as an efficient metals getter or sink. Preferably a relatively soft, highly porous alumina, is used. Metals tend to deposit on the alumina, and the gradual attrition of the alumina permits metals to be removed from the unit with catalyst "fines". Other metal getters, e.g., BaO, MgO, CaO, $La_2O_3$, $Ce_2O_3$ and similar alkaline and/or rare earth compounds may be present as part of the matrix, or as a separate additive catalyst.

Large Pore Cracking Component

The large-pore molecular sieve cracking component may be a conventional zeolite. Some of these, and patents describing their preparation are discussed hereinafter. Zeolite L, zeolite X, zeolite Y, and preferably higher silica forms of zeolite Y such as Dealuminized Y (DAY Y; U.S. Pat. No. 3,442,795); Ultrastable Y (USY; U.S. Pat. No. 3,449,070), Ultrahydrophobic Y (UHP-Y U.S. Pat. Nos. 4,331,694; 4,401,556), and similar materials are preferred for use herein. Zeolite beta (B, U.S. Pat. No. 3,308,069) or Zeolite L (U.S. Pat. Nos. 3,216,789; 4,544,539; 4,554,146 and 4,701,315) may also be used. These materials may be subjected to conventional treatments, such as impregnation or ion exchange with rare earths to increase stability. These patents are incorporated herein by reference.

These large-pore molecular sieves have a geometric pore opening of about 7 angstroms in diameter. In current commercial practice, most of the cracking of large molecules in the feed is done using these large pore molecular sieves.

Very Large Pore Cracking Component

In addition to the large-pore cracking components described above which have found extensive use commercially, several recently developed very large-pore cracking components may also be used. All of these materials have an equivalent pore size greater than 7 Angstroms. Some are molecular sieves (such as VPI-5) while others are not (expanded clays).

VPI-5 is a molecular sieve with pores larger than about 10 Angstrom units in diameter. It is an aluminophosphate sieve with 18-membered rings of T-atoms. They resemble the better known $AlPO_4$-5 materials. Such molecular sieves have very large pore volumes, and extremely large pore openings. Such large pore sieves would be very useful for cracking the very large molecules associated with high boiling or residual fractions. VPI-5 was described by M. Davis, C. Saldarriaga, C. Montes, and J. Garces in a paper presented at "Innovations in Zeolite Materials Science" Meeting in Nieuwpoort, Belgium, Sept. 13-17, 1987. M. E. Davis, C. Saldarriaga, C. Montes, J. Garces and C. Crowder, Nature 331, 698 (1988).

Pillared, interlayered clays or silicates may also be used as a large pore cracking component. U.S. Pat. No. 4,742,033 discloses a pillared interlayered clay. This patent is incorporated by reference.

U.S. Pat. No. 4,515,901 discloses forming an interlayered pillared clay by mixing a clay with a polar solvent, a soluble carbohydrate, and a soluble pillaring agent. The mixture is then heated to form the interlayered pillared clay. Useful clays are smectites such as montmorillonite.

In U.S. Pat. No. 4,367,163, pillars of silica are added to smectites to increase the interplatelet distances. U.S. Pat. Nos. 4,515,901 and 4,367,163 are incorporated herein by reference.

U.S. Pat. No. 4,757,041, which is incorporated herein by reference, discloses a class of pillared interlayered clay molecular sieve products with regularly interstratified mineral structure. These materials are prepared by cross-linking interstratified mineral clay, and are reported to possess extraordinary thermal and hydrothermal stabilities.

U.S. Pat. No. 4,600,503 (Angevine et al), which is incorporated herein by reference, discloses thermally stable layered metal oxides containing interspathic polymeric oxides employed in hydrotreating catalyst used to upgrade residual oils. The layered materials disclosed in that patent may be used as all of part of the "large pore" cracking component of the catalyst of the present invention.

Published European patent application EP No. 0 284 278 A2 (Kirker et al), which is incorporated herein by reference, discloses hydrocracking a heavy feed containing polycyclic aromatics to form a lube based stock. The hydrocracking catalyst is a layered silicate such as magadiite which contains interspathic polymeric silica and interspathic polymeric oxides of one or more of Al, B, Cr, Ga, In, Mo, No, Ni, Ti, Tl, W and Zr. Such layered silicates may be used as all or part of the large pore cracking component of the present invention.

Published European Application EP No. 0 205 711 A2 (Chu et al), which in incorporated herein by reference, discloses layered oxides containing interlayer polymeric oxides and their synthesis. Layered oxides of high thermal stability and surface area which contain interlayer polymeric oxides such as polymeric silica are prepared by ion exchanging a layered metal oxide, such as layered titanium oxide, with organic cation to spread the layers apart. A compound, such as tetraethylorthosilicate, capable of forming a polymeric oxide, is thereafter introduced between the layers. The resulting product is treated to form polymeric oxide, e.g., by hydrolysis to produce the layered oxide product. Such layered materials may be as used all or part of the large pore cracking component of the present invention.

U.S. Pat. No. 4,238,364 discloses the preparation of stabilized pillared, interlayered clays. U.S. Pat. No. 4,665,220 discloses use of these clays as catalysts in reactions capable of catalysis by protons. The contents of both of these patents are incorporated herein by reference.

SAPO's, or silicon-substituted aluminophosphates, which have a three dimensional crystal framework of suitable size may also be used as the large pore cracking component. U.S. Pat. Nos. 4,440,871 and 4,741,892 and 4,689,138, which are incorporated herein by reference, disclose silicoalumino phosphate molecular sieves.

It should be emphasized that the process and catalyst of the present invention does not require the use of any single "large pore" cracking component. It is essential to have at least one cracking component, e.g., RE-USY, VPI-5, or pillared clay and mixtures thereof which has an equivalent pore diameter in excess of about 7 Angstrom units.

The "bottom of the barrel" conversion catalyst may also contain some shape selective zeolites, but for maximum effectiveness, the shape selective zeolites are in separate, elutriable particles, as discussed hereafter.

Top of the Barrel Conversion Catalyst

The shape selective paraffin cracking/isomerization component, in an elutriable particle with different physical properties from the conventional FCC catalyst, can be any shape selective zeolite which at the conditions experienced in a catalytic cracking unit promotes formation of olefinic and/or iso-olefinic materials. Any zeolite having a constraint index of 1-12 can be used herein but ZSM-5 is especially preferred. Details of the Constraint Index test procedures are provided in J. Catalysis 67, 218–222 (1981) and in U.S. Pat. No. 4,711,710 (Chen et al), both of which are incorporated herein by reference.

Preferred shape selective zeolites are exemplified by ZSM-5, ZSM-11, ZSM-12, ZSM-23, ZSM-35, ZSM-48, ZSM-57 and similar materials.

ZSM-5 is described in U.S. Pat. No. 3,702,886, U.S. Pat. No. Reissue 29,948 and in U.S. Pat. No. 4,061,724 (describing a high silica ZSM-5 as "silicalite").

ZSM-11 is described in U.S. Pat. No. 3,709,979.
ZSM-12 is described in U.S. Pat. No. 3,832,449.
ZSM-23 is described in U.S. Pat. No. 4,076,842.
ZSM-35 is described in U.S. Pat. No. 4,016,245.
ZSM-57 is described in U.S. Pat. No. 4,046,859.

These patents are incorporated herein by reference.

Zeolites in which some other framework element is present in partial or total substitution of aluminum can be advantageous. Elements which can be substituted for part of all of the framework aluminum are boron, gallium, zirconium, titanium and trivalent metals which are heavier than aluminum. Specific examples of such catalysts include ZSM-5 and zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

Preferably, relatively high silica shape selective zeolites are used, i.e., with a silica/alumina ratio above 20/1, and more preferably with a ratio of 70/1, 100/1, 500/1 or even higher.

Preferably the shape selective paraffin cracking/isomerization zeolite is placed in the hydrogen form by conventional means, such as exchange with ammonia and subsequent calcination. The zeolite may be used in any form which promotes paraffin upgrading.

The shape selective zeolite can be used neat, but preferably is contained in a matrix. The matrix can be the same as that used as the matrix for the large pore molecular sieve.

The preferred, but optional shape selective aromatization component can be any zeolite having a constraint index of 1–12 and additional components which promote paraffin aromatization at catalytic cracking conditions.

Gallium is especially preferred for use herein because of its ability to convert light paraffins such as propanes and butanes into aromatic hydrocarbons which are valuable as petrochemicals or as high octane gasoline blending components. Ga may be incorporated into the zeolite framework during synthesis or it may be exchanged or impregnated or otherwise incorporated into the ZSM-5 after synthesis. Preferably 0.05 to 10, and most preferably, 0.1 to 2.0 wt % gallium is associated with the aromatization zeolite.

It is possible to use the same shape selective zeolite function for both paraffin cracking/isomerization and for aromatization. Control of the acidity of the zeolite (alpha value) and of the nature and amount of the additional components which promote aromatization permits this. Partial exchange of HZSM-5 with gallium is one way to do this.

In this case, the ZSM-5 would preferably contain 0.05 to 1.0 wt % gallium. The reduced gallium content allows both paraffin cracking/isomerization and aromatization to occur.

Preferably the zeolite components (large pore molecular sieve, paraffin cracking/isomerization zeolite, and the optional aromatization zeolite) comprise 20–90 wt. % of the mixture, with the remainder being matrix. On a matrix free basis, the relative ratios of the three zeolites can vary greatly, depending on feedstocks, products desired, and to a lesser extent on catalytic cracking conditions.

In practice, the large pore molecular sieve may be an "off the shelf" zeolite in a conventional or in a custom matrix. Said large pore zeolite can be relatively simple and need not be optimized for, e.g., maximum high octane gasoline production. The exotic upgrading of the "top of the barrel" can be performed by the shape selective additive catalysts. The high silica zeolite additives are low coke producers so they do not deactivate as quickly as the conventional bulk conversion catalyst. Much of the expensive overall optimization of the cracking process can be performed using the separate particle additive catalysts, but this expense can be tolerated because these additive catalysts will retain activity longer and exert a disproportionally larger catalytic effect because of their extended residence time in the riser reactor.

In general, the function of the large pore molecular sieve cracking components is bulk conversion of heavy feed to lighter materials, including light paraffins and light olefins in the $C_2$–$C_{10}$ range.

The light paraffins are not preferred products. The $C_5^+$ paraffins tend to be relatively low in octane number. They can be upgraded by conventional means such as platinum reforming, but this increases costs. There is a significant yield loss during reforming, and reliance on reforming tends to increase the aromatics content of the gasoline pool.

The shape selective zeolite cracking/isomerization catalyst converts a significant portion of these paraffins to olefins and iso-olefins, with much higher octane number, in the case of the $C_5^+$ olefins, and much more reactivity in the case of the $C_4^-$ olefins.

The light olefins produced by the shape selective cracking/isomerization catalyst and by the large pore molecular sieve cracking catalyst can be easily upgraded in conventional alkylation units. In addition, the iso-olefins can be processed in etherification units to high octane oxygenates such as MTBE or TAME. By increasing the amount of shape selective cracking/isomerization catalyst present in the quadro catalyst, it is possible to enhance the production of $C_2$–$C_{10}$ olefins and, via subsequent alkylation or etherification steps, increase gasoline yields and octane number, with aliphatic components rather than aromatic components.

The shape selective aromatization zeolite converts $C_{10}^-$ paraffins, and especially $C_4^-$ paraffins, to aromatics. The aromatics produced, primarily benzene, toluene, and xylene (BTX) are extremely valuable both as petrochemicals or as high octane gasoline blending components.

Preferably the conventional, large pore molecular sieve cracking component is present in an amount roughly equal to four times the combined amount of shape selective paraffin cracking/isomerization zeolite and shape selective paraffin aromatization zeolite. Thus, an elutriable catalyst mixture containing 80 wt. % REUSY zeolite, 10 wt. % HZSM-5 and 10 wt. % GaZSM-5 (all on a matrix free basis), as measured in the riser reactor, will give very good results.

Preferably the zeolite content of the additive catalyst(s) is somewhat higher than the zeolite content of the large pore molecular sieve catalyst. Either the paraffinic cracking/isomerization additive catalyst or the aromatization additive catalyst may comprise 5–90% zeolite, but shape selective zeolite concentrations of 10-90%, and preferably 20-80%, make optimum use of the zeolite. There is no physical lower limit on shape selective zeolite concentration, but use of additive catalysts containing low concentrations of shape selective zeolite tend to dilute the large-pore molecular sieve containing catalyst (or bulk conversion catalyst) and for this reason, relatively high ZSM-5 concentrations, in excess of 20%, or even over 40%, allow "top-of-the barrel" conversion without diluting excessively the large pore molecular sieve cracking catalyst.

Integrating the above discussion, the following guidelines regarding relative amounts and formulations of catalyst mixtures can be given

| Component, Type | | Component, Wt. % (Matrix Free Basis) | | |
|---|---|---|---|---|
| | | Suitable | Preferred | Most Preferred |
| Large Pore Mol. Sieve | | 40-98% | 50-95% | 50-90 |
| Paraffin Cracking/Isomerization | | 2-30% | 2.5-25% | 5-25 |
| Paraffin Aromatization | | 0-30% | 2.5-25% | 5-25 |
| The zeolite/matrix ratios are: | | | | |
| Large Pore Mol. Sieve | Zeolite | 10-60 | 12-40 | 15-25 |
| | Matrix | 40-90 | 60-88 | 75-25 |
| Paraffin Cracking/Isom. | Zeolite | 10-100 | 20-90 | 30-70 |
| | Matrix | 0-90 | 80-10 | 70-30 |
| Paraffin Aromatization | Zeolite | 10-100 | 20-90 | 30-70 |
| | Matrix | 0-90 | 80-10 | 70-30 |

CATALYST PHYSICAL PROPERTIES

The paraffin cracking/isomerization additive catalyst must be separable from the large pore molecular sieve cracking catalyst by physical means. In practice, this can most easily be achieved by formulating the additive catalyst so that it has a faster settling velocity than the conventional catalyst. Faster settling of additive catalyst permits the unit to be designed to minimize the time the additive catalyst spends in the regenerator. Even if a conventional regenerator, riser reactor, stripper etc. are used, the faster settling additive catalyst will have an extended residence time in the riser reactor, which will increase the relative concentration of the additive catalyst in the riser.

Settling rates depend on density, size and shape of catalyst. Each of these will be briefly discussed.

Increased catalyst density increases its residence time in a riser reactor. To increase the residence time of the additive catalyst, e.g. the shape selective zeolite catalyst in the riser, the additive catalyst density can vary from 0.6 to 4.0 gm/cm$^3$, and preferably from 2.0 to 3.0 gm/cm$^3$, when the density of the conventional catalyst varies from 0.4 to 1.1 gm/cm$^3$ density, and preferably from 0.6 to 1.0 gm/cm$^3$.

One technique for increasing the density of the additive catalyst is to composite the, e.g., shape selective zeolite with a matrix which cokes quickly. This coking increases the density of the additive catalyst in situ. An illustrative matrix is hydrated alumina which in situ forms a transition alumina having a high coking rate. This embodiment possesses several additional advantages. In the coked-up state, the additive catalyst is more resistant to attrition from collision with other particles in the riser. Such collisions also slow down the conventional catalyst in the riser by colliding with it, and knocking it back down the riser, momentarily. The coked-up additive catalyst also tends to accumulate metals present in the feed.

Conventional steps can be taken during catalyst manufacture, discussed hereafter, to increase the density of the additive catalyst.

The particle size of the additive catalyst, and the conventional catalyst, can be adjusted by conventional steps during manufacture. As between two otherwise identicle particles of different size, the larger will remain in the riser longer. To increase the residence time of the additive catalyst in the riser the average particle size of the additive catalyst should be larger than that of the conventional catalyst. For example, the average particle size of the additive can vary from 100 microns to 70,000 microns, and preferably from 500 to 25,000 microns while the average particle size of the conventional catalyst varies from about 20 to 150 microns, and preferably from about 50 to 100 microns.

The shape, or geometry, also affects relative settling rates. The more irregular the shape (i.e., the more the shape deviates from a sphere), the longer the residence time of the particles in the riser. Irregular-shaped particles can be readily made by using an extruded catalyst or crushing the extrudate.

The settling rate depends on the interaction of density, average particle size and particle shape. These factors each contribute to the desired result. For example, additive catalyst can simultaneously be denser, larger and more irregular in shape than the conventional catalyst. These factors may partially offset one another, e.g., a much denser and slightly smaller average particle size additive catalyst can have a significantly faster settling rate than the conventional catalyst.

FCC CRACKING CONDITIONS

The FCC cracking conditions include a riser top temperature from 930°-1100° F., preferably 970°-1050° F., and most preferably 985°-1025° F.; catalyst:oil weight ratios from 3-12, preferably 4-11, and most preferably 5-10; catalyst residence time of from 0.5-15 seconds, preferably 1-10 seconds.

RISER ELUTRATION

The additive catalyst's physical properties cause faster settling or "slip" in the riser than the settling rate or "slip" of conventional catalyst particles. The additive catalyst therefore remains in the riser reactor longer than the conventional FCC catalyst. Residence time of catalyst in the riser depends primarily on the settling velocity and the superficial vapor velocity up the riser of conversion products and unconverted feed. In conventional FCC units, all catalyst components circulate through the system at about the same rate. The additive catalyst, e.g., ZSM-5 in a matrix, does not require as frequent regeneration as the conventional catalyst. The additive's useful life is shortened by excessive regeneration. In the invention, the additive catalyst can remain longer, potentially forever, suspended in the riser. The density, particle size and/or shape of the additive catalyst can be adjusted to provide the desired settling characteristics. In general, as particle size or density increases, the residence time of the additive catalyst in the riser increases.

Increasing the cross sectional area of the riser will increase the riser residence time of the additive catalyst. Numerous geometric configurations can achieve this. The riser can flare out for a part of its length at the base, or at an upper section of the riser. The superficial vapor velocity decreases in the flared portion of the riser, and may approach the settling velocity of the additive. The additive "slips" back in the rising vapor and concentrates in regions of reduced vapor velocity.

A preferred elutriating riser is shown in U.S. Pat. Nos. 4,717,466 and 4,752,375 incorporated herein by reference.

STRIPPER ELUTRIATION

If the additive catalyst is larger and denser than the conventional catalyst component then gradual attrition of the additive (through particle collision) will gradually reduce additive size and residence time in the riser. As time goes on, more additive will enter the stripper where another stage of catalyst separation can occur. This arrangement, i.e., increased residence time in the riser coupled with additive separation in the stripper, reduces circulation of the less coke deactivated additive through the regenerator.

Elutriating strippers are preferably used to minimize residence time of the additive in the regenerator. Suitable elutriating strippers are shown in U.S. Pat. No. 4,752,375 (relying on density differences to effect separation) and in U.S. Pat. No. 4,717,466 (relying more on elutriation). These patents are incorporated herein by reference.

REGENERATION

Regeneration of the large pore molecular sieve cracking catalyst is conventional.

Preferably, the additives are kept out of the regenerator. If the additives are sent to the regenerator, it should be modified so that the dense, fast settling additive catalysts are not trapped in the regenerator. Providing a bottom drain-off from any point in the regenerator where low superficial vapor velocities are expected will suffice.

An elutriating regenerator, such as that disclosed in U.S. Pat. No. 4,116,814, which is incorporated herein by reference, may be used to allow some regeneration of the additive, while minimizing the residence time of the additive in the regenerator.

REACTIVATION

Once resolution of the catalyst mixture in different regions of the stripper has been accomplished, the additive catalyst, e.g., a catalyst comprising a shape selective zeolite may be reactived with a suitable reactivating medium, e.g., $H_2$ or $H_2$-rich gas, under conventional reactivation conditions, e.g., a temperature of 427° to 815° C. (800° F. to 1500° F.) or even higher and preferably 538° to 760° C. (1000° F. to 1400° F.). Preferably, the $H_2$ or $H_2$-rich gas added is hotter than the catalyst. This improves the efficiency of any stripping taking place therein. The reactivation gas may be preheated by exchange with hot regenerated catalyst or flue gas from the regenerator. The reactivation effluent gas may be combined with the other product gases. The additive catalyst may or may not have been stripped before reactivation. If not completely stripped, the reactivation helps desorb hydrocarbons entrained on the additive.

CATALYST MANUFACTURE

The large pore crystalline molecular sieve catalyst can be made using conventional techniques for mixing zeolite and matrix material.

The shape selective zeolite additive catalyst can also be made using standard techniques.

The different zeolite or molecular sieve components can be wet ball milled or dry blended together, and then may be added to a suitable matrix, e.g. a silica-alumina gel, clay composite or an alumina-clay composite or a silica sol or other matrix such as an alumina rich sol and further mixed. The matrix and zeolite mixture can be extruded, prilled, marumerized, tabletted, dropped in an oil bath, etc. to form relatively large particles. For use in fluidized bed catalytic cracking units the matrix-zeolite mixture is preferably spray dried, but any other means can be used to make a fluidizable catalyst particle, such as crushing or grinding larger size extrudates or pills.

EXAMPLES OF CATALYST PREPARATION

The large pore molecular sieve catalyst (CATALYST A) is prepared according to the procedure described next. 3000 gms of Davison Z-14US (ignited basis) in the form of an approximate 30% ballmilled slurry containing deagglomerated particles (95% < 5 microns) is added to 1304 gms of 50% aluminum chlorhydrol (23% $Al_2O_3$, 8% Cl, Reheis Co.) and 2700 gms of Kaolin clay (ignited basis, Georgia Kaolin) in a 15 gallon Nalgene container containing 5996 gms of DI water. The mixture is subjected to high shear conditions using a Cowles Dissolver (Morehouse Industries; Fullerton, Calif.) equipped with 6.5" blade turning at 700-800 rpm for 30 minutes to prepare a pre-spray-dryer slurry. The solids content of the slurry is adjusted between 25-40% using additional DI water, as necessary. Also, the slurry pH is adjusted between 4.0-4.6 using 20% $H_2SO_4$ or 50% $NH_4OH$, as necessary. The slurry is then spray-dried at 370° F. outlet temperature. The spray dryer (Komline-Sanderson; Peapack, N.J.) is operated at 5.5 psig air pressure with 0.03" nozzle at 250 cc/minute feed rate using a Moyno feed pump (Springfield, Ohio). The spray dried particles are calcined for 2 hours at 1000° F. in flowing air. Subsequently, the catalyst is first column exchanged with 1.0N $NH_4NO_3$ solution followed by a slurry exchange using a solution containing 1.5 wt % rare earth chlorides prepared from 60% AR solution, Code 1443, Davison Specialty Chemicals). Both exchanges are carried out @5/1, solution/catalyst weight ratio. The catalyst is next washed chloride free and then dried at 250° F. overnight before use. The nominal catalyst composition is 50% RE-USY (Z-14US) and 50% matrix (10% alumina binder, 90% clay).

The shape selective intermediate pore zeolite catalyst (CATALYST B) is prepared according to the procedure described next. Two solutions are prepared; Solution A contains 41 parts sodium silicate solution ($SiO_2$/$Na_2O$ ratio of 3.22), 5 parts $NH_4$ ZSM-5 (ignited basis), 5 parts GaZSM-5 (ignited basis), 2.5 parts -alumina (corundum), 1.9 parts NaOH, and 44.6 parts $H_2O$. Deagglomeration of the solids (i.e. HZSM-5, GaZSM-5 and alpha-alumina) incorporated into Solution A is affected by ballmilling to 95% 5 microns. The solids are ballmilled as an aqueous slurry using approximately 29 parts of the 44.6 total parts $H_2O$ needed to make Solution A. The entire aqueous slurry is added to Solution A. Solution B contains 3.4 parts $Al_2(SO_4)_3$, 5.8 parts $H_2SO_4$, and 90.8 parts $H_2O$. These two solutions are cooled to 60° F. (15.6° C.), then combined by mixing through a nozzle such that the pH is maintained at 8.4 plus or minus 0.2. The resultant mixture is passed through a 5 foot (1.524 m) column of oil at room temperature during which time the combined solutions will gel and form spherical particles about ½ inch (12.700 microns) in diameter prior to contact with the water which supports the column of oil. These rigid particles are then separated from and washed essentially free of residual oil. The particles are subsequently contacted with a solution of 1.5% wt $Al_2(SO_4)_3$ for a total of 18 hours, using new solution every two hours and then washed until no sulfate can be detected in the effluent by testing with barium chloride solution. The catalyst is placed in slotted trays and dried in an approximately 100% steam atmosphere to a final temperature of 320° F. (160° C.) for a minimum of 15 minutes. The catalyst is further subjected to steam calcination or tempering for 12 hours at 1290° F. (699° C.) in approximately 95% steam/5% air at atmospheric pressure. The nominal catalyst composition is 20 weight % HZSM-5, 20 weight % GaZSM-5, 10 weight % corundum and 50 weight % binder ($SiO_2$—$Al_2O_3$ cogel).

A multicomponent cracking catalyst mixture is prepared by blending 95 weight percent of CATALYST A with 5 weight percent CATALYST B.

ILLUSTRATIVE EMBODIMENT

The following illustrative embodiment does not represent an actual experiment. It is an estimate, but one based on much other experimental work.

The illustrative embodiment is an estimate of the yields obtainable in a conventional FCC unit charging the same feed, at the same conditions, and changing only the catalyst compositions.

I. (Prior Art) The conventional catalyst represents a conventional large pore zeolite based cracking catalyst in a matrix. No ZSM-5 is present.

II. (Prior Art) Represents a conventional cracking catalyst plus 10 wt % HZSM-5.

III. Represents yields obtainable from a quadro caalyst, i.e., one containing 5 wt. % GaZSM-5 and 5 wt. % HZSM-5 where the total ZSM-5 content is the same as in II (above). The GaZSM-5 and HZSM-5 are present in equimolar amounts. The GaZSM-5 contains 1 wt % Ga in the ZSM-5 framework.

IV (Invention) Represents a quadro catalyst with the GaZSM-5 and HZSM-5 present in a separate particle, encapsulated in an alumina matrix.

| % of FF | Conv. (No ZSM-5) I | Conv. + ZSM-5 II | Conv. & GaZSM-5 & ZSM-5 III | Con. & GaZSM-5/ ZSM-5 & Alumina Matrix IV |
|---|---|---|---|---|
| Gasoline | 51.1 | 49.5 | 49.7 | 49.7 |
| Paraffins | 22.7 | 21 | 21 | 21 |
| Olefins | | | | |
| $C_6^-$ | 3.8 | 4.5 | 4.0 | 4.0 |
| $C_7^+$ | 10.6 | 10.0 | 10.0 | 10.0 |
| Aromatics | 8.5 | 8.5 | 9.2 | 9.2 |
| Naphthenes | 5.5 | 5.5 | 5.5 | 5.5 |
| LCO | 16 | 16 | 16 | 16.8 |
| HCO | 8 | 8.0 | 8 | 7.2 |
| $C_3^= + C_4^=$ | 8.7 | 10.3 | 10.1 | 10.1 |
| $C_2^-$ | 3.5 | 3.5 | 3.5 | 3.5 |
| Gasoline Composition | | | | |
| Paraffins | 44.5 | 42.5 | 42.5 | 42.5 |
| Olefins | 28.0 | 29.5 | 28 | 28 |
| Naphthenes | 11 | 11 | 11 | 11 |
| Aromatics | 16.5 | 17 | 18.5 | 18.5 |
| Gasoline Octane No. | | | | |
| Research | 92.6 | 93.6 | 94.0 | 94.0 |

-continued

| % of FF | Conv. (No ZSM-5) I | Conv. + ZSM-5 II | Conv. & GaZSM-5 & ZSM-5 III | Con. & GaZSM-5/ ZSM-5 & Alumina Matrix IV |
|---|---|---|---|---|
| Clear | | | | |

OPTIMIZING

By varying the relative amounts of shape selective zeolite having paraffin cracking/isomerization to shape selective zeolite having paraffin aromatization selectivity, it is possible to continually change the reactions which occur in the FCC riser reactor.

Increasing the amount of paraffin aromatization zeolite, relative to paraffin cracking/isomerization zeolite, will increase the aromaticity of the gasoline product. This is desirable where highest octane gasoline is needed, or when more aromatics are needed to supply benzene, toluene, and xylene for petrochemical purposes.

When large amounts of aromatics in a gasoline product cannot be tolerated, e.g., as a result of governmental regulations limiting the aromatic content of the gasoline, it is possible to mimimize the aromatic content of the gasoline by dramatically reducing or eliminating the amount of paraffin aromatization zeolite present.

Further fine-tuning of "top of the barrel" conversion that occurs is possible by either starving, or overloading, the riser with the relatively heavy, fast settling additive catalyst. Changing the superficial vapor velocity in the riser can profoundly change the residence time of the additive catalyst in the riser. If the fast settling additive catalyst has a settling velocity approximately equal to that of the superficial vapor velocity in the riser at some point (whether in an enlarged section of the riser, or at the base of a conventional riser with roughly uniform superficial vapor velocities throughout the riser) it will be possible to decrease the average residence time from several hours to just a few minutes by minor increases in superficial vapor velocity.

Because the fast settling additive catalyst of the present invention spends much more time in the riser, and much less time in the FCC regenerator (where most of the hydrothermal deactivation occurs), their use in the FCC unit can be optimized. The economic optimum may be an extremely long residence time in the unit, until the shape selective zeolite activity drops to an unacceptable level due to coke deactivation. In many instances the economic optimum will call for more aggressive shape selective additive catalyst replacement, maintaining an extraordinarily high level of zeolite activity for the shape selective zeolite. Because of repeated recycling through the regenerator, the large pore molecular sieve catalyst rapidly loses activity. The faster settling, shape selective zeolite catalyst of the present invention is not so restricted, because it will spend much less time in the regenerator.

The conventional FCC catalyst, especially the preferred catalysts with an alumina-rich matrix, will act as metals sink and keep the shape selective zeolites relatively free of metals. Using the process of the present invention, an efficient overall catalytic cracking process can be achieved on "bottom of the barrel" feedstocks using a relatively cheap, disposable, large-pore molecular sieve catalyst to achieve bulk conversion, while using the shape selective additive to upgrade the gasoline and light gas fractions produced. The shape selective zeolites will also achieve a measure of dewaxing, or dealkylation of long alkyl chains on aromatic groups, which provides further economic justification for the use of the shape selective additive catalyst.

Thus the practice of the present invention allows efficient "top of the barrel" conversion to occur simultaneously with "bottom of the barrel" conversion. It is surprising that two such different processes could be performed effectively in a conventional FCC unit.

What is claimed:

1. A catalytic cracking catalyst mixture comprising catalytically effective amounts of a blend of:
   (a) a cracking catalyst of a large pore molecular sieve in a matrix, and
   (b) an additive catalyst, separable by physical means from the cracking catalyst, comprising a shape selective zeolite having a constraint index of 1-12, being substantially free of hydrogenation/dehydrogenation components, and having paraffin cracking/isomerization activity, a shape selective zeolite having a constraint index of 1-12 and having paraffin aromatization activity and a matrix.

2. The catalyst of claim 1 wherein the large pore molecular sieve has a portal comprising at least 12 member rings.

3. The mixture of claim 1 wherein the large pore molecular sieve is selected from the group of zeolite beta, zeolite L, zeolite Y, Dealuminized Y, Ultrastable Y, and Ultrahydrophobic Y.

4. The mixture of claim 1 wherein the large pore molecular sieve is rare earth, Ultrastable Y zeolite.

5. The mixture of claim 1 wherein the large pore molecular sieve is selected from the group of VPI-5, SAPO-37, and pillared clays.

6. The mixture of claim 1 wherein at least one of the shape selective zeolites having a constraint index of 1-12 is selected from the group of ZSM-5, ZSM-11, ZSM-22, ZSM-23, ZSM-35 and ZSM-57.

7. The mixture of claim 4 wherein the shape selective zeolite having paraffin cracking selectivity is selected from the group of ZSM-5 and ZSM-11.

8. The mixture of claim 1 wherein the shape selective zeolite having paraffin cracking/isomerization activity is in the hydrogen form.

9. The mixture of claim 1 wherein the aromatization zeolite and the paraffin cracking/isomerization zeolite are the same shape selective zeolite, and the zeolite contains 0.05 to 10 wt % aromatization component.

10. The mixture of claim 9 wherein the shape selective zeolite contains 0.1 to 2.0 wt % gallium.

11. The mixture of claim 1 wherein the paraffin cracking/isomerization zeolite is HZSM-5.

12. The mixture of claim 1 wherein the aromatization zeolite is gallium ZSM-5.

13. The mixture of claim 1 wherein the matrix, of the cracking catalyst exclusive of large pore molecular sieves, comprises at least 20 wt % alumina.

14. The mixture of claim 13 wherein the matrix comprises 30-50 wt % alumina.

15. The mixture of claim 1 wherein the additive catalyst comprises 10-60 wt % shape selective zeolite.

16. The mixture of claim 1 wherein the cracking catalyst has a settling velocity and the additive catalyst has a settling velocity at least 50% greater.

17. The mixture of claim 1 wherein the mixture comprises:
   (a) 50-98 wt. % cracking catalyst
   (b) 2-25 wt. % paraffin cracking/isomerization additive catalyst
   (c) 0-35 wt. % aromatization additive catalyst.

18. The mixture of claim 1 comprising:
   (a) 12-40 wt. % percent zeolite Y which has been at least partially dealuminized;
   (b) 0.2-20 wt. % ZSM-5; at least a portion of which is in the hydrogen form, and a portion of which contains gallium, and the gallium content is equal to 0.05 to 1.0 wt % of the total ZSM-5 content.

* * * * *